US011912314B2

(12) United States Patent
Austrheim

(10) Patent No.: US 11,912,314 B2
(45) Date of Patent: Feb. 27, 2024

(54) EXPRESS BIN LIFT FOR AUTOMATED STORAGE SYSTEM

(71) Applicant: Autostore Technology AS, Nedre Vats (NO)

(72) Inventor: Trond Austrheim, Etne (NO)

(73) Assignee: Autostore Technology AS, Nedre Vats (NO)

( * ) Notice: Subject to any disclaimer, the term of this patent is extended or adjusted under 35 U.S.C. 154(b) by 0 days.

(21) Appl. No.: 17/935,774

(22) Filed: Sep. 27, 2022

(65) Prior Publication Data

US 2023/0013974 A1 Jan. 19, 2023

Related U.S. Application Data

(63) Continuation of application No. 17/058,676, filed as application No. PCT/EP2019/065177 on Jun. 11, 2019, now Pat. No. 11,628,849.

(30) Foreign Application Priority Data

| Jun. 12, 2018 | (NO) | 20180813 |
| Jul. 19, 2018 | (NO) | 20181005 |
| Dec. 5, 2018 | (NO) | 20181569 |

(51) Int. Cl.
*B65G 1/04* (2006.01)
*B61B 13/00* (2006.01)
(Continued)

(52) U.S. Cl.
CPC ............ *B61B 13/00* (2013.01); *B65G 1/0414* (2013.01); *B65G 1/0457* (2013.01);
(Continued)

(58) Field of Classification Search
CPC .......................... B65G 1/0464; B65G 1/0478
(Continued)

(56) References Cited

U.S. PATENT DOCUMENTS 3,519,150 A 7/1970 Keena et al.
3,800,963 A 4/1974 Holland
(Continued)

FOREIGN PATENT DOCUMENTS

CA 2988122 A1 12/2016
CN 101553416 A 10/2009
(Continued)

OTHER PUBLICATIONS

Extended European Search Report in counterpart European Application No. 21 186 410.3 dated Nov. 25, 2021 (5 pages).
(Continued)

*Primary Examiner* — Jonathan Snelting
(74) *Attorney, Agent, or Firm* — Osha Bergman Watanabe & Burton LLP

(57) ABSTRACT

A lift system for an automated storage system of the type where storage containers are stacked in storage columns arranged in a grid, and where automated container handling vehicles retrieve and replace containers from a top level of the grid. The lift system has a platform vertically movable adjacent to a face of the grid, arranged for receiving and transporting one or more containers. A dedicated mechanical device is arranged for grabbing, lifting and moving the storage containers from a staging area at the top of the grid and placing containers on the platform and vice versa.

3 Claims, 19 Drawing Sheets

(51) Int. Cl.

| | | |
|---|---|---|
| B65G 1/06 | (2006.01) | |
| B65G 1/137 | (2006.01) | |
| B65G 47/06 | (2006.01) | |
| B65G 47/52 | (2006.01) | |
| B65G 57/03 | (2006.01) | |
| B65G 63/06 | (2006.01) | |
| B65G 65/23 | (2006.01) | |
| B65G 67/24 | (2006.01) | |
| B66F 9/06 | (2006.01) | |
| B66F 9/19 | (2006.01) | |
| G05D 1/00 | (2006.01) | |
| B60W 50/00 | (2006.01) | |
| B65G 43/00 | (2006.01) | |
| B65G 63/00 | (2006.01) | |

(52) U.S. Cl.
CPC ......... *B65G 1/0464* (2013.01); *B65G 1/0471* (2013.01); *B65G 1/0478* (2013.01); *B65G 1/0485* (2013.01); *B65G 1/0492* (2013.01); *B65G 1/065* (2013.01); *B65G 1/1375* (2013.01); *B65G 47/06* (2013.01); *B65G 47/52* (2013.01); *B65G 57/03* (2013.01); *B65G 63/06* (2013.01); *B65G 65/23* (2013.01); *B65G 67/24* (2013.01); *B66F 9/063* (2013.01); *B66F 9/19* (2013.01); *G05D 1/0011* (2013.01); *G05D 1/021* (2013.01); *G05D 1/0291* (2013.01); *B60W 50/0098* (2013.01); *B60W 2710/06* (2013.01); *B60W 2720/10* (2013.01); *B60W 2720/24* (2013.01); *B65G 1/1378* (2013.01); *B65G 43/00* (2013.01); *B65G 63/004* (2013.01); *B65G 2201/0235* (2013.01); *B65G 2201/0258* (2013.01); *B65G 2203/0283* (2013.01); *B65G 2203/042* (2013.01); *G05D 1/02* (2013.01); *G05D 1/0229* (2013.01); *G05D 1/0231* (2013.01); *G05D 1/0259* (2013.01); *G05D 1/0289* (2013.01); *G05D 2201/0216* (2013.01)

(58) Field of Classification Search
USPC ....................................................... 414/279
See application file for complete search history.

(56) References Cited

U.S. PATENT DOCUMENTS

| | | | |
|---|---|---|---|
| 4,538,950 A | 9/1985 | Shiomi et al. | |
| 4,909,697 A | 3/1990 | Bernard, II et al. | |
| 5,078,566 A | 1/1992 | Ferrence | |
| 5,360,306 A | 11/1994 | Nakayama et al. | |
| 5,538,809 A | 7/1996 | Bittihn et al. | |
| 7,101,139 B1 | 9/2006 | Benedict | |
| 8,628,289 B1 | 1/2014 | Benedict et al. | |
| 9,527,669 B1 | 12/2016 | Hanssen et al. | |
| 11,628,849 B2 * | 4/2023 | Austrheim | B60W 50/0098 414/279 |
| 2003/0093176 A1 | 5/2003 | Ohtsuka et al. | |
| 2005/0047895 A1 | 3/2005 | Lert | |
| 2008/0014062 A1 | 1/2008 | Yuyama et al. | |
| 2011/0027059 A1 | 2/2011 | Benedict et al. | |
| 2012/0282068 A1 | 11/2012 | Tschurwald et al. | |
| 2013/0302132 A1 | 11/2013 | D'Andrea | |
| 2014/0014470 A1 | 1/2014 | Razumov | |
| 2014/0086714 A1 | 3/2014 | Malik | |
| 2014/0277693 A1 | 9/2014 | Naylor | |
| 2014/0288696 A1 | 9/2014 | Lert | |
| 2014/0292274 A1 | 10/2014 | Dorval et al. | |
| 2014/0311858 A1 | 10/2014 | Keating et al. | |
| 2015/0127143 A1 | 5/2015 | Lindbo et al. | |
| 2016/0060037 A1 | 3/2016 | Razumov | |
| 2016/0137435 A1 | 5/2016 | Tanaka et al. | |
| 2016/0145058 A1 | 5/2016 | Lindbo | |
| 2016/0176638 A1 | 6/2016 | Toebes | |
| 2016/0194151 A1 | 7/2016 | Lindbo et al. | |
| 2016/0325932 A1 | 11/2016 | Hognaland | |
| 2017/0050809 A1 | 2/2017 | Itoh et al. | |
| 2017/0057745 A1 | 3/2017 | Ueda et al. | |
| 2017/0166400 A1 | 6/2017 | Hofmann | |
| 2018/0044110 A1 | 2/2018 | Clarke et al. | |
| 2018/0065804 A1 | 3/2018 | Hognaland | |
| 2018/0068253 A1 | 3/2018 | Simms et al. | |
| 2018/0082162 A1 | 3/2018 | Durham et al. | |
| 2018/0118078 A1 | 5/2018 | Alkhaldi et al. | |
| 2018/0141754 A1 | 5/2018 | Garrett et al. | |
| 2018/0150793 A1 | 5/2018 | Lert, Jr. et al. | |
| 2020/0148474 A1 | 5/2020 | Salichs et al. | |

FOREIGN PATENT DOCUMENTS

| | | |
|---|---|---|
| CN | 101711210 A | 5/2010 |
| CN | 102050333 A | 5/2011 |
| CN | 102992012 A | 3/2013 |
| CN | 104066661 A | 9/2014 |
| CN | 104781163 A | 7/2015 |
| CN | 104885106 A | 9/2015 |
| CN | 105383848 A | 3/2016 |
| CN | 105899398 A | 8/2016 |
| CN | 105947514 A | 9/2016 |
| CN | 106064718 A | 11/2016 |
| CN | 106241154 A | 12/2016 |
| CN | 106414278 A | 2/2017 |
| CN | 106575391 A | 4/2017 |
| CN | 106662874 A | 5/2017 |
| CN | 106829298 A | 6/2017 |
| CN | 206790852 U | 12/2017 |
| CN | 108140168 A | 6/2018 |
| DE | 4016810 C1 | 11/1991 |
| DE | 9310690 U1 | 9/1993 |
| DE | 102009017241 A1 | 10/2010 |
| EP | 0458021 A1 | 11/1991 |
| EP | 0534558 A1 | 3/1993 |
| EP | 2615056 A1 | 7/2013 |
| EP | 2881905 A1 | 6/2015 |
| EP | 3003932 A1 | 4/2016 |
| EP | 2780263 B1 | 8/2016 |
| EP | 3288865 A1 | 3/2018 |
| EP | 3406543 A1 | 11/2018 |
| GB | 1 267 751 A | 3/1972 |
| GB | 1276160 A | 6/1972 |
| GB | 2106070 A | 4/1983 |
| GB | 2211822 A | 7/1989 |
| GB | 2233319 A | 1/1991 |
| JP | S60-137703 A | 7/1985 |
| JP | S6417707 A | 1/1989 |
| JP | S6485656 A | 3/1989 |
| JP | H06-043936 A | 2/1994 |
| JP | H08-217209 A | 8/1996 |
| JP | H09152914 A | 6/1997 |
| JP | H11-143538 A | 5/1999 |
| JP | 2000-191106 A | 7/2000 |
| JP | 2003-137406 A | 5/2003 |
| JP | 2009-184775 A | 8/2009 |
| JP | 2009-541177 A | 11/2009 |
| JP | 2011-102166 A | 5/2011 |
| JP | 2015-535517 A | 12/2015 |
| JP | 2017088404 | 5/2017 |
| JP | 2017-524625 A | 8/2017 |
| KR | 20170026074 A | 3/2017 |
| NO | 317366 B1 | 10/2004 |
| RU | 2008111257 A | 10/2009 |
| WO | 96/14258 A1 | 5/1996 |
| WO | 2005077789 A1 | 8/2005 |
| WO | 2012/106746 A1 | 8/2012 |
| WO | 2012106745 A1 | 8/2012 |
| WO | 2013167907 A1 | 11/2013 |
| WO | 2014/075937 A1 | 5/2014 |
| WO | 2014/090684 A1 | 6/2014 |
| WO | 2014/195901 A1 | 12/2014 |
| WO | 2014203126 A1 | 12/2014 |
| WO | 2015/084236 A1 | 6/2015 |

(56) References Cited

FOREIGN PATENT DOCUMENTS

| | | | |
|---|---|---|---|
| WO | 2015/170660 A1 | 11/2015 | |
| WO | 2015/193278 A1 | 12/2015 | |
| WO | 2016166294 A1 | 10/2016 | |
| WO | 2016166323 A1 | 10/2016 | |
| WO | 2016172793 A1 | 11/2016 | |
| WO | 2016/196815 A1 | 12/2016 | |
| WO | 2016/198467 A1 | 12/2016 | |
| WO | 2016198565 A1 | 12/2016 | |
| WO | 2017081273 A1 | 5/2017 | |
| WO | 2017081281 A1 | 5/2017 | |
| WO | 2017/121512 A1 | 7/2017 | |
| WO | 2017/121515 A1 | 7/2017 | |
| WO | 2017153563 A1 | 9/2017 | |
| WO | 2017211640 A1 | 12/2017 | |
| WO | 2017220651 A1 | 12/2017 | |
| WO | 2018162757 A1 | 9/2018 | |

OTHER PUBLICATIONS

Office Action issued in the counterpart Chinese Patent Application No. 201980037723X, dated Sep. 17, 2021 (25 pages).
Office Action issued in the counterpart Chinese Patent Application No. 2019800383353, dated Dec. 17, 2021 (3 pages).
Office Action issued in Chinese Application No. 2019800396936 dated Oct. 18, 2021 (6 pages).
Office Action issued in Chinese Application No. 2019800381061 dated Sep. 8, 2021 (8 pages).
Office Action issued in Chinese Application No. 2019800390681 dated Sep. 15, 2021 (23 pages).
Office Action issued in Chinese application No. 201980039028.7 dated Oct. 27, 2021 (15 pages).
Office Action issued in Chinese Application No. 201980039046.5 dated Sep. 15, 2021 (18 pages).
Office Action issued in Chinese Application No. 2019800388569 dated Oct. 19, 2021 (16 pages).
Office Action in counterpart Chinese Patent Application No. 2019800538763 dated Dec. 6, 2021 (13 pages).
Office Action in counterpart Chinese Patent Application No. 2019800393798 dated Dec. 9, 2021 (17 pages).
United States Office Action in related U.S. Appl. No. 16/972,482, dated Mar. 22, 2022 (46 pages).
ISR of Sep. 12, 2019 in PCT/EP2019/065153.
ISR of Sep. 12, 2019 in PCT/EP2019/065166.
NOSR of May 3, 2019 in NO20181569.
NOSR of Feb. 6, 2019 in NO2018005.
ISR of Jan. 29, 2020 in PCT/EP2019/065177.
Office Action issued in counterpart Japanese Patent Application No. 2020-569128 dated Jul. 3, 2023 (6 pages).
Office Action issued in counterpart Japanese Patent Application No. 2020-568698 dated May 29, 2023 (9 pages).
Office Action issued in counterpart Japanese Patent Application No. 2020-569140 dated Jun. 2, 2023 (5 pages).
Office Action issued in counterpart Japanese Patent Application No. 2020-568714 dated Jul. 3, 2023 (16 pages).
Office Action issued in counterpart Japanese Patent Application No. 2020-568805 dated Jun. 5, 2023 (7 pages).
Office Action issued in counterpart Japanese Patent Application No. 2020-568712, dated Jun. 26, 2023 (7 pages).
Office Action issued in European Application No. 19730155.9; dated Sep. 4, 2023 (6 pages).

* cited by examiner

EXPRESS BIN LIFT FOR AUTOMATED STORAGE SYSTEM

TECHNICAL FIELD

The present invention relates to an automated storage and retrieval system for storage and retrieval of containers, in particular to a lift apparatus and system for moving containers between vertical levels of a grid storage system.

BACKGROUND AND PRIOR ART

Automated grid storage system generally:

FIG. 1 discloses a typical prior art automated storage and retrieval system of the type sold commercially by the present applicant. FIG. 1 shows a framework structure 100 and FIGS. 2 and 3 disclose two different prior art container handling vehicles 201,301 suitable for operating on such a system.

The framework structure 100 comprises a number of upright members 102 and a number of horizontal members 103 which are supported by the upright members 102. The members 102, 103 may typically be made of metal, e.g., extruded aluminum profiles.

The framework structure 100 defines a storage grid 104 comprising storage columns 105 arranged in rows, in which storage columns 105 storage containers 106, also known as bins, are stacked one on top of another to form stacks 107. The storage grid 104 guards against horizontal movement of the stacks 107 of storage containers 106, and guides vertical movement of the containers 106, but does normally not otherwise support the storage containers 106 when stacked.

The automated storage and retrieval system 1 comprises a rail system 108 arranged in a grid pattern across the top of the storage grid 104, on which rail system 108 a plurality of automated container handling vehicles 201,301 travel. The container handling vehicles have a gripping/lifting mechanisms 202/302 used to grip, and then raise storage containers 106 from, or lower storage containers 106 into, the storage columns 105. In one embodiment shown in FIGS. 2a and 2b, the gripping/lifting mechanism 202 raises the containers into a cavity in the body of the vehicle. FIGS. 3a and 3b show an alternative configuration of a container handling vehicles 301 in which the gripping/lifting mechanism 302 is arranged as part of a cantilever construction 303. Such a vehicle is described in detail in e.g., N0317366, the contents of which are also incorporated herein by reference.

The container handling vehicles are arranged to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction. Y which is perpendicular to the first direction X. In this way, the rail system 108 defines grid columns 1 12 above which the container handling vehicles 201,301 can move laterally in an X or Y direction above the storage columns 105, i.e., in a plane which is parallel to the horizontal X-Y plane. The upper part of a column (105/112) in the horizontal plane, denoting the position of the column in the grid in the two horizontal dimensions, may be referred to as a "cell".

For monitoring and controlling the automated storage and retrieval system 1, e.g. monitoring and controlling the location of respective storage containers 106 within the grid 104, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system which typically is computerized and which typically comprises a database for keeping track of the storage containers 106.

Transport of containers to an access station or different levels in a multi-level grid system:

The containers in the grid system often must be moved from their positions in the columns to an access station (not shown), typically located at a lower level of the grid, where an operator, either human or automated, may remove items from the containers to be placed in a shipping container or the like, and/or restock a container for replacement in the grid.

In a storage grid 104, a majority of the grid columns 112 are storage columns 105, i.e., columns where storage containers 106 are stored in stacks 107. However, a grid 104 normally has at least one grid column 112 devoid of storage containers 106, through which the container handling vehicles 201,301, using their own lifting mechanisms, can raise or lower storage containers 106 to a different level. Within the art, such a grid column is referred to as a 'port column' 1 19,120 and the location at the top or bottom of the column is normally referred to as a 'port'. According to one aspect, a conveyor belt system may be arranged below the port column, onto which the container handling vehicles lower the containers for further transport to and from the access station. In some instances, a grid has one or more port columns dedicated to lowering containers for delivery, and different port columns dedicated to lifting containers for retrieval.

In other instances, a grid storage system comprises a plurality of vertically arranged levels or sections, each with its own top level and container handling vehicles. In such a multi-level system it is often desirable to move a container from one level to another. This also is performed by a container handling vehicle lowering or raising a container from one level to another through a port column.

WO/2014/075937 describes a storage system with a dedicated bin lift arrangement for vertically transporting storage bins to a delivery station or different levels of a multi-level storage system. The lift arrangement is arranged to transport bins through one or more individual port columns.

Disadvantages with the prior art:

There are a number of disadvantages to using the lifting mechanism of the container handling vehicles themselves to vertically move containers through a port column.

One disadvantage is that the prior art system requires very precise construction and maintenance of the framework structure in order for the port columns to be properly aligned. This is particularly true in a multi-level system, where the various levels must be painstakingly aligned with each other in order for a container passing through a port column of one level to properly meet a column of a different level. Misalignment of the framework may also result in vehicle collisions. Any future settling or shifting of the framework (for example due to temperature differences) can cause port columns to become misaligned thus disrupting the delivery of containers.

Another disadvantage is that the speed and robustness of the lifting mechanism of the container handling vehicles is necessarily limited due to considerations of size and expense of the vehicles. This reduces the throughput capacity of the automated storage system.

A further disadvantage is that congestion may occur in the vicinity of a port, as vehicles wait for other vehicles to vacate the space above the port columns. This also negatively impacts the throughput capacity of the automated storage system.

SUMMARY OF THE INVENTION

The invention has been defined in the patent claims.

More specifically, the invention provides a storage system as set forth in the introduction, which further comprises a platform vertically movable adjacent to a face of the grid, arranged for receiving and transporting one or more containers. A dedicated mechanical device is arranged for grabbing, lifting and moving the storage containers from the top of the grid and placing containers on the platform and vice versa.

In one embodiment, the dedicated mechanical device is a manipulator trolley arranged to travel along two parallel trolley rails, said trolley rails extending from a position above the grid to a position above the platform wherein the area between the trolley rails defines a staging area comprising a plurality of cells arranged to receive storage bins awaiting retrieval by the manipulator trolley and/or to receive storage bins awaiting retrieval by the handling vehicles.

The storage system may comprise multiple vertically arranged levels, each of the grids being provided with its own manipulator trolley. In this arrangement the platform in one embodiment is movable in a horizontal direction in an amount sufficient to compensate for any horizontal misalignment between the grids, such that containers transported from one level may be retrieved by a manipulator trolley on a different level.

According to another aspect, the invention provides a platform for transporting storage containers between a plurality of vertically arranged storage grids in a multi-level storage system. The platform is vertically movable along one or more vertical rails arranged outside and functionally adjacent to vertically aligned faces of the grid sections. The platform is horizontally adjustable in relation to the one or more vertical rails in an amount sufficient to accommodate a horizontal misalignment between the rail systems of the respective grid sections.

In one embodiment, wherein the platform is horizontally adjustable in that it comprises a vertically movable frame member to which is connected a horizontally movable carriage member. The carriage member further comprises one or more alignment wheels connected to the carriage member at a position whereby the alignment wheels travel along a surface of the vertical rails during vertical movement of the platform. On the vertical rails is arranged one or more alignment brackets. The alignment brackets comprise an upper and lower sloped surface and protrude from a side of the vertical rails a distance corresponding to an intended horizontal adjustment distance for the platform. In use the alignment wheels will, during vertical movement of the frame member, contact and roll up sloped surface of the protruding alignment bracket mounted on the vertical rail, thereby causing the carriage member to move in the horizontal direction in relation to the frame member.

According to yet another aspect, the invention provides a method transporting storage containers in an automated storage grid system of the type according to the preamble of claim 1. The method according to this aspect comprises:

a. Arranging a vertically moveable platform adjacent to a face of the grid, b. Arranging a dedicated mechanical device for grabbing, lifting and moving the storage containers from the top of the grid and placing containers on the platform and vice versa, c. Designating a number a cells (P) for the placement of storage containers awaiting movement from the grid to the platform, d. Designating a number of cells (G) for the placement of storage containers awaiting retrieval by container handling vehicles, e. Causing the container handling vehicles to place storage containers on cells (P), f. Causing the dedicated mechanical device to remove any containers from the platform and place said containers on cells (G), g. Causing the dedicated mechanical device to lift the storage containers from cells (P) and place the containers on the platform, and h. Causing the platform to lower the containers to a lower level in the grid system.

The system and method of the invention, at least in the preferred embodiments, can be seen to provide one or more of the following advantages:

It provides a more robust and powerful dedicated lifting and lowering mechanism for vertically transporting storage containers than possible by using the lifting mechanisms of the vehicles. This increases the capacity and through put of the storage system, and avoids costly wear and tear on the lifting mechanisms of the vehicles.

Alignment of grid levels in a multi-level storage system is not as critical, since the platform can be adjusted sideways to account for misalignments.

The staging area allows container handling vehicles to drop off containers and continue on with other tasks, thus avoiding down time or congestion around a port.

Port columns can be rededicated to storage.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION

Figure 1:
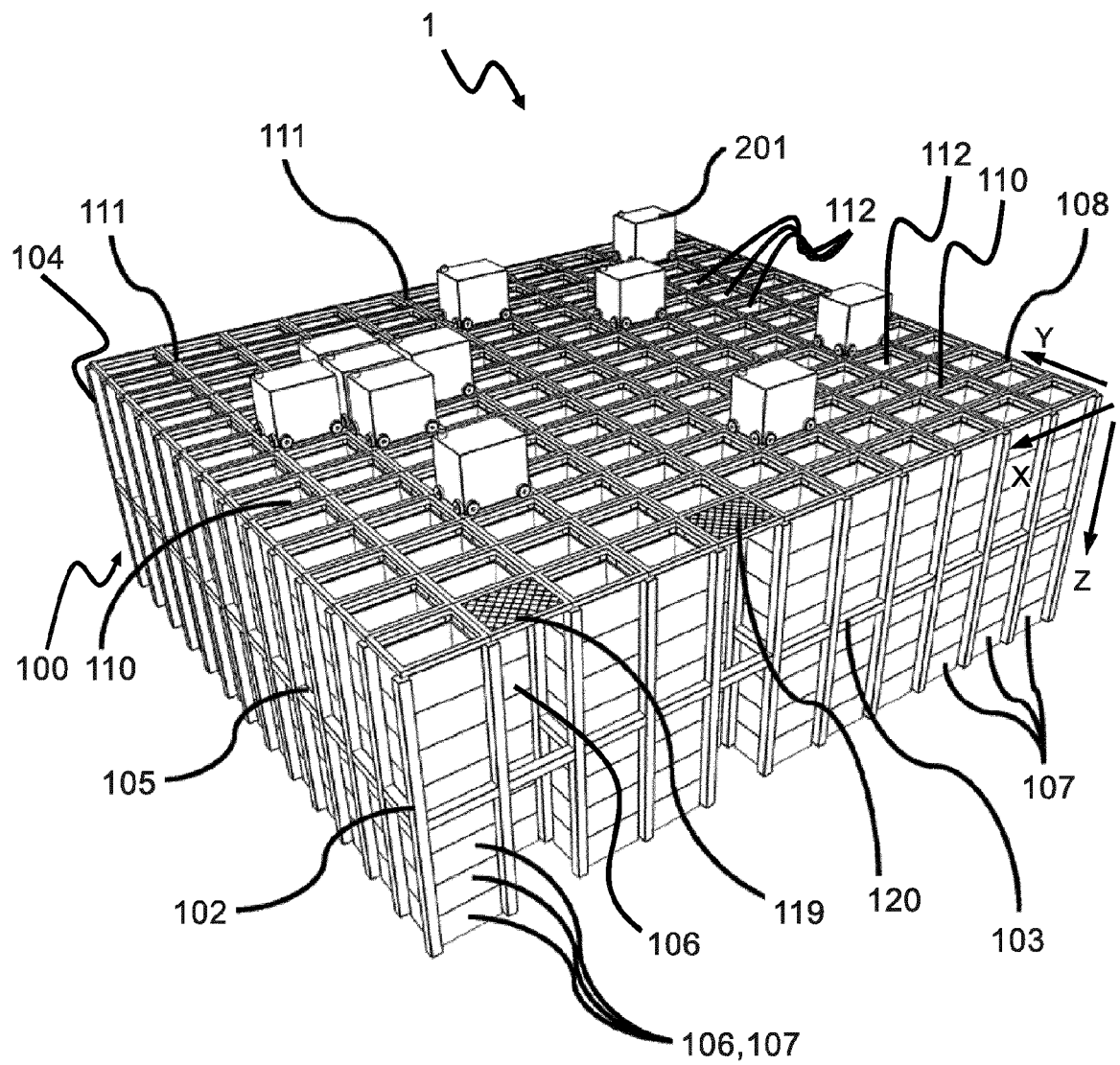
FIG. 1 is a perspective view of a grid of a prior art automated storage and retrieval system.

In the following, embodiments of the invention will be discussed in more detail by way of example only and with reference to the appended drawings. It should be understood, however, that the drawings are not intended to limit the invention to the subject-matter depicted in the drawings.

Figures 2A, 2B:
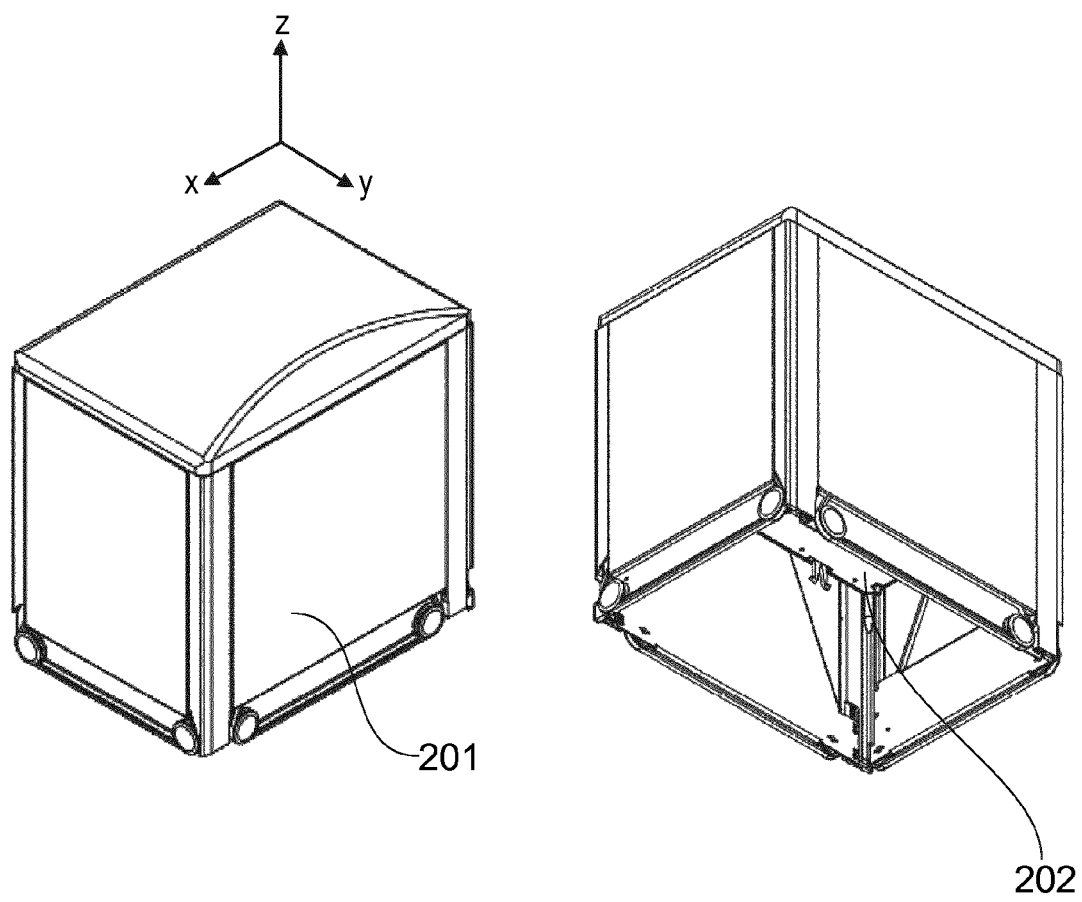
FIGS. 2a and 2b show a perspective view of a prior art container handling vehicle having a centrally arranged cavity for containing storage containers therein.
Figure 3A:
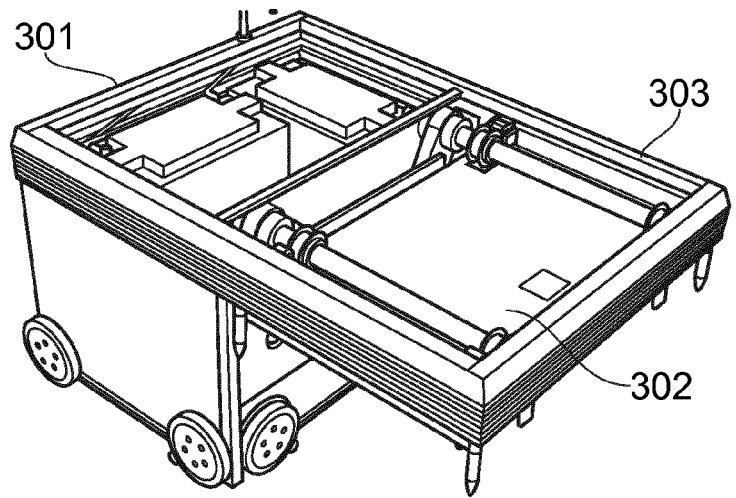
FIGS. 3a and 3b show a perspective view of a prior art container handling vehicle having a cantilever for containing storage containers underneath.
Figure 3B:
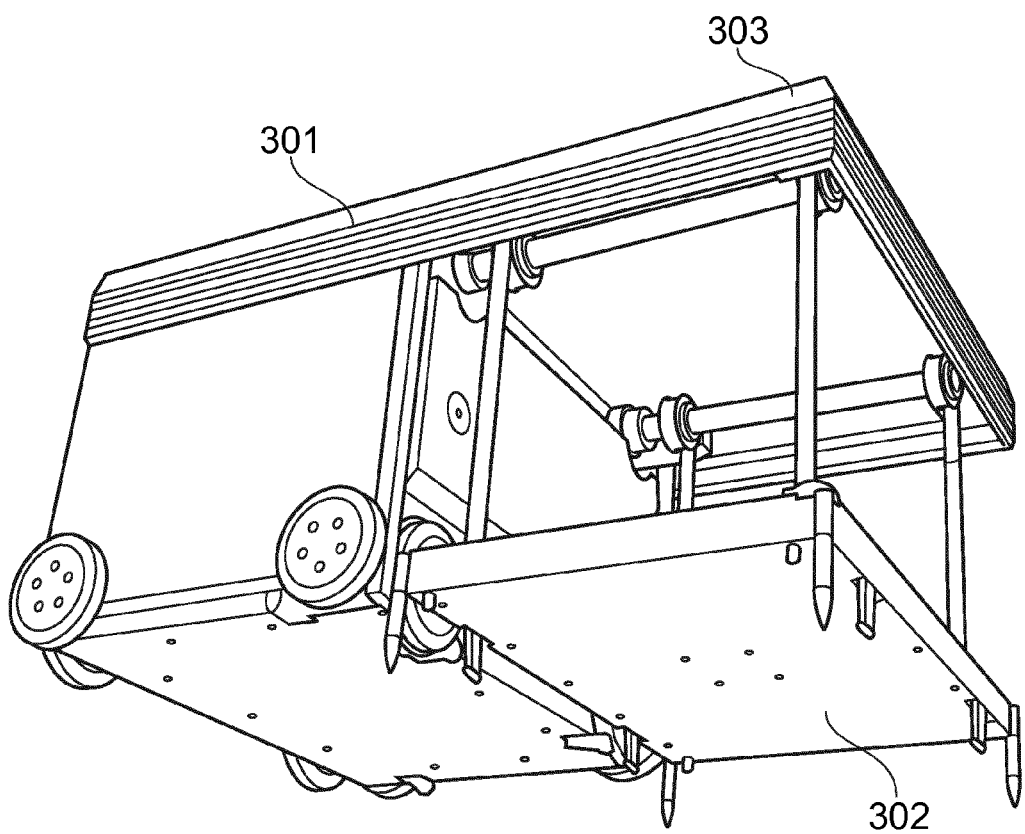

The present invention provides an automated storage and retrieval system 1 constructed in accordance with the prior art as described above in connection with FIGS. 1-3, i.e., a framework 100 having a number of upright members 102 and a number of horizontal members 103, which are supported by the upright members 102 to define a first storage grid 104. The storage grid 104 comprises grid columns 112, a plurality of which are storage columns 105 in which are stacked storage containers 106. Framework 100 comprises a track system 108 of parallel tracks 110,111 extending in an X direction and Y direction arranged across the top of storage grid 104, upon which travel a plurality of container handling vehicles (201/301). The container handling vehicles are preferably autonomous vehicles arranged to lift storage containers 106 from storage columns 105 and transport the storage containers about the grid, as well as placing storage containers back in the storage columns 105.

In FIG. 1 the storage grid 104 is shown with a height of eight cells. It is understood, however, that the storage grid 104 in principle can be of any size. In particular it is understood that storage grid 104 can be considerably wider and/or longer and/or deeper than disclosed in FIG. 1. For example, the storage grid 104 may have a horizontal extent of more than 700×700 grid cells and a depth of more than twelve grid cells.

Figure 4:
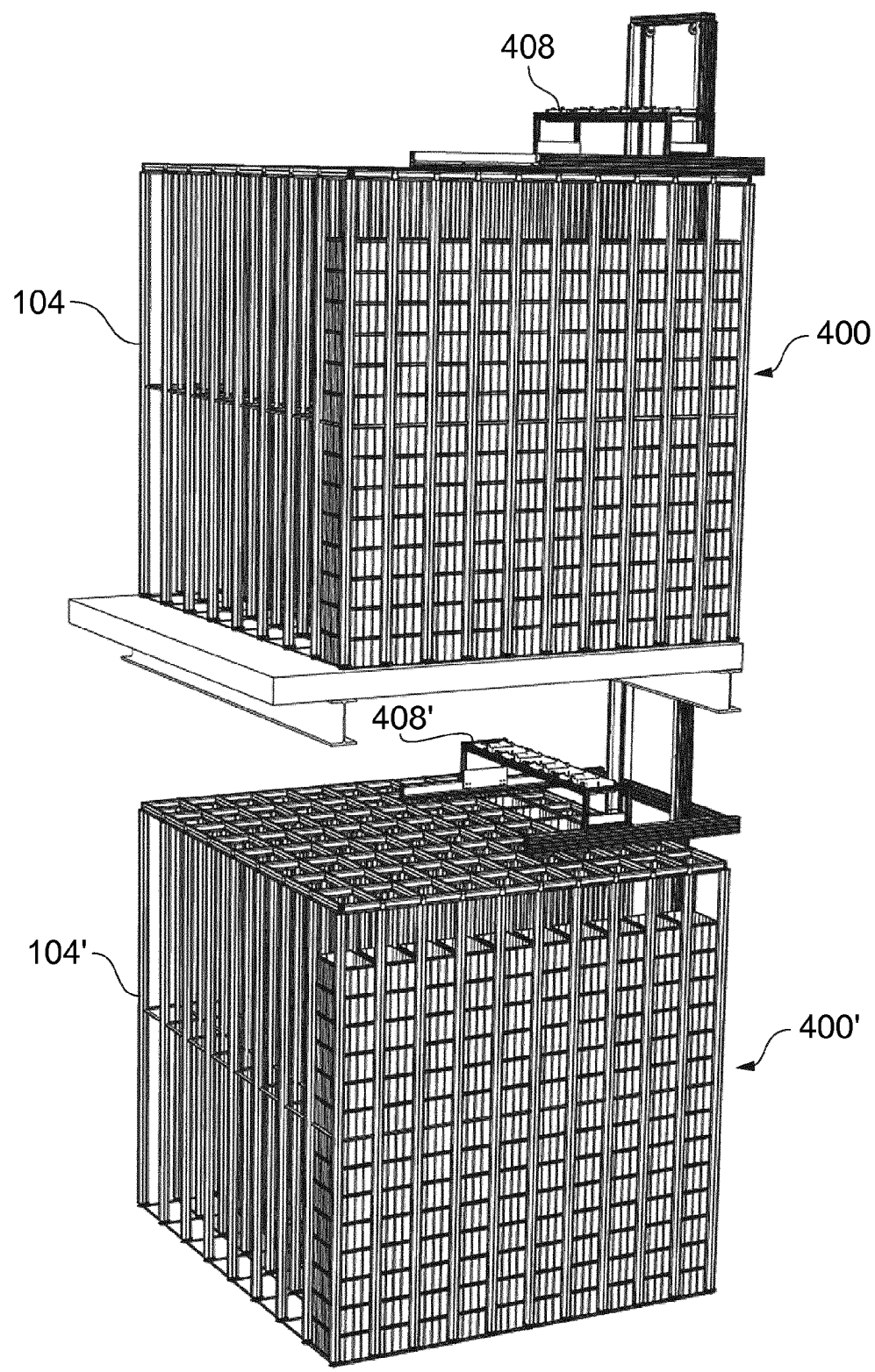
FIG. 4 is a perspective view of a multi-level automated storage and retrieval system.
Figure 5:
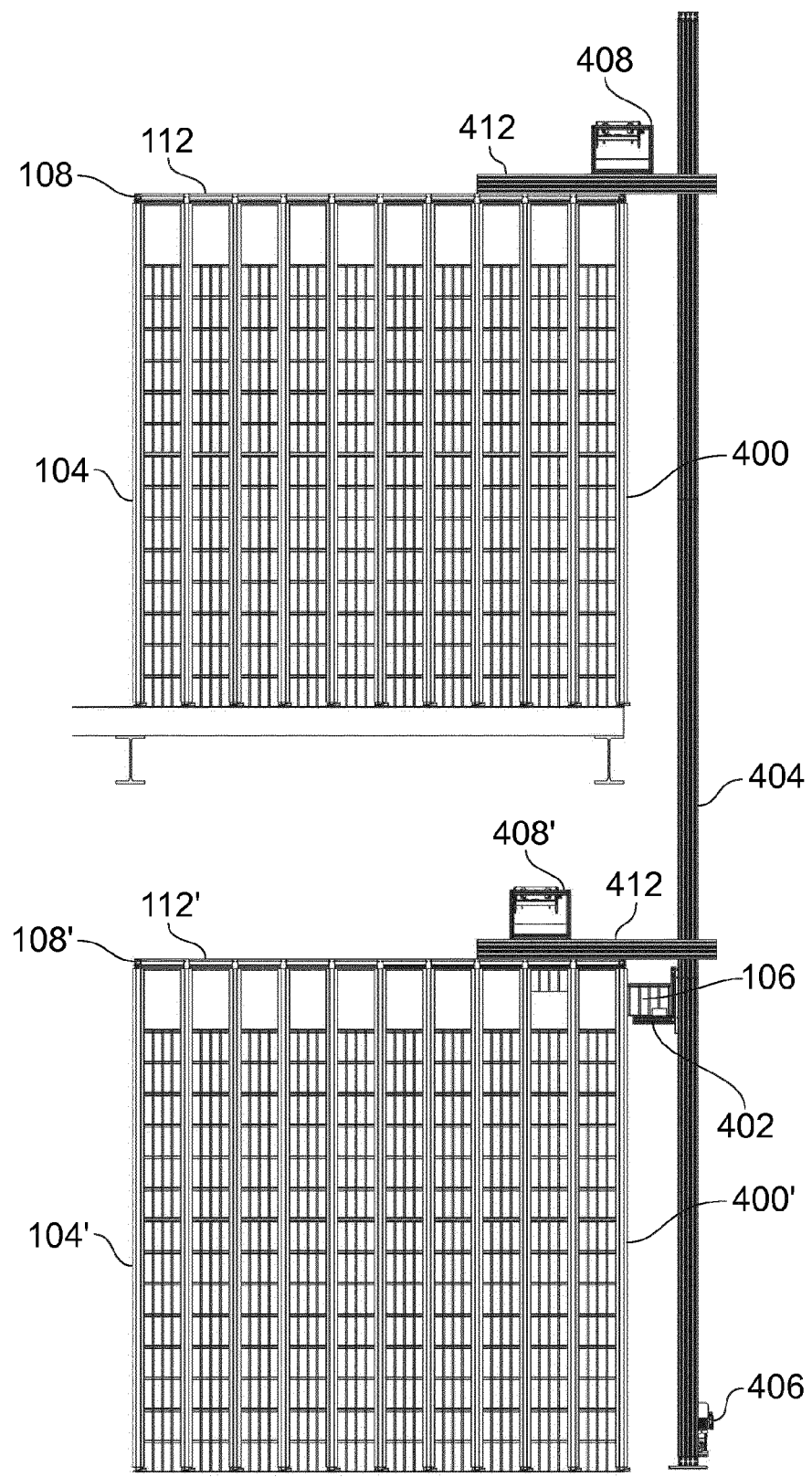
FIG. 5 is a side elevational view of a multi-level automated storage and retrieval system.
Figure 6:
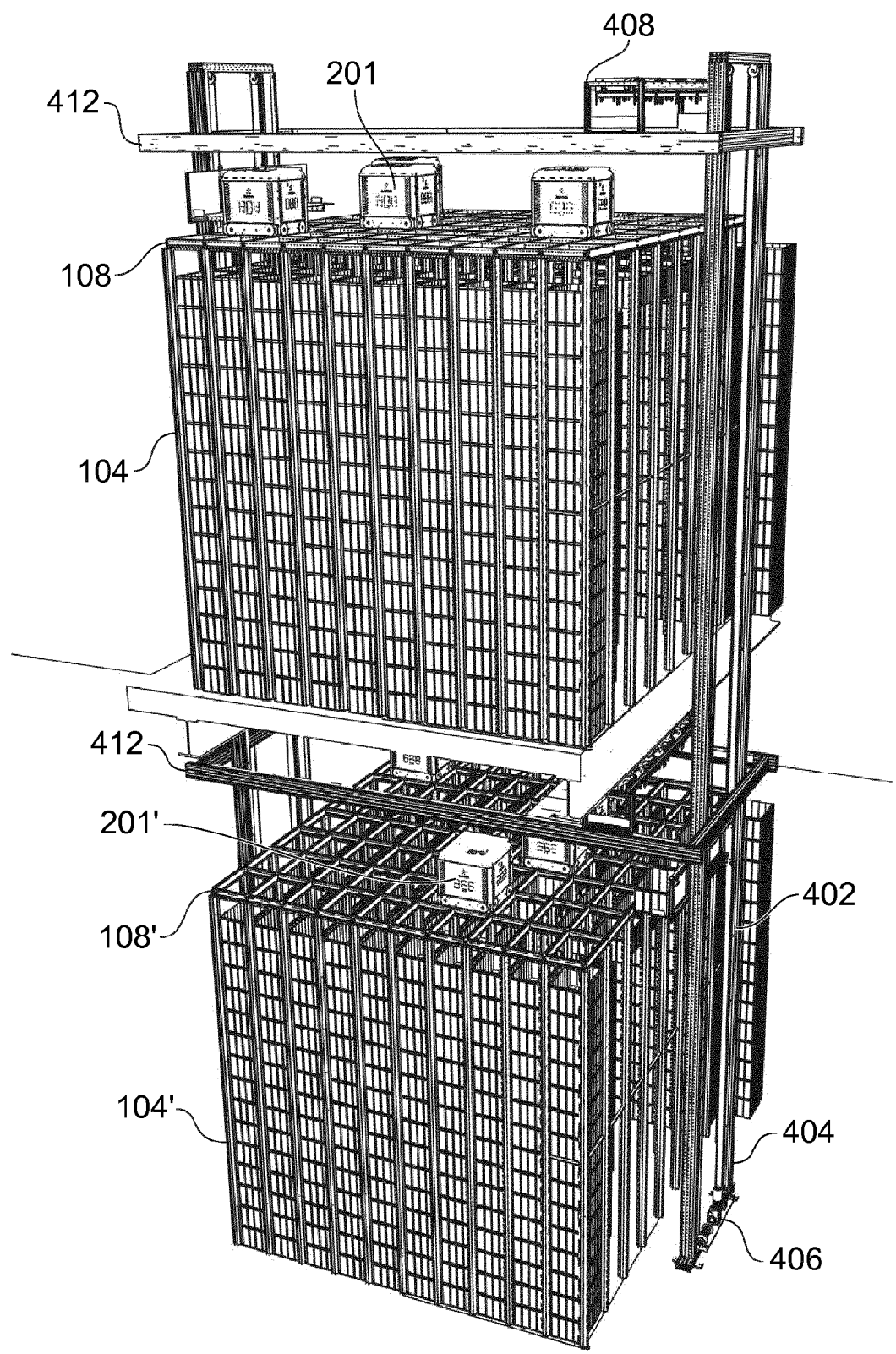
FIG. 6 a perspective view of a multi-level automated storage and retrieval system with container handling vehicles depicted.
Figure 7:
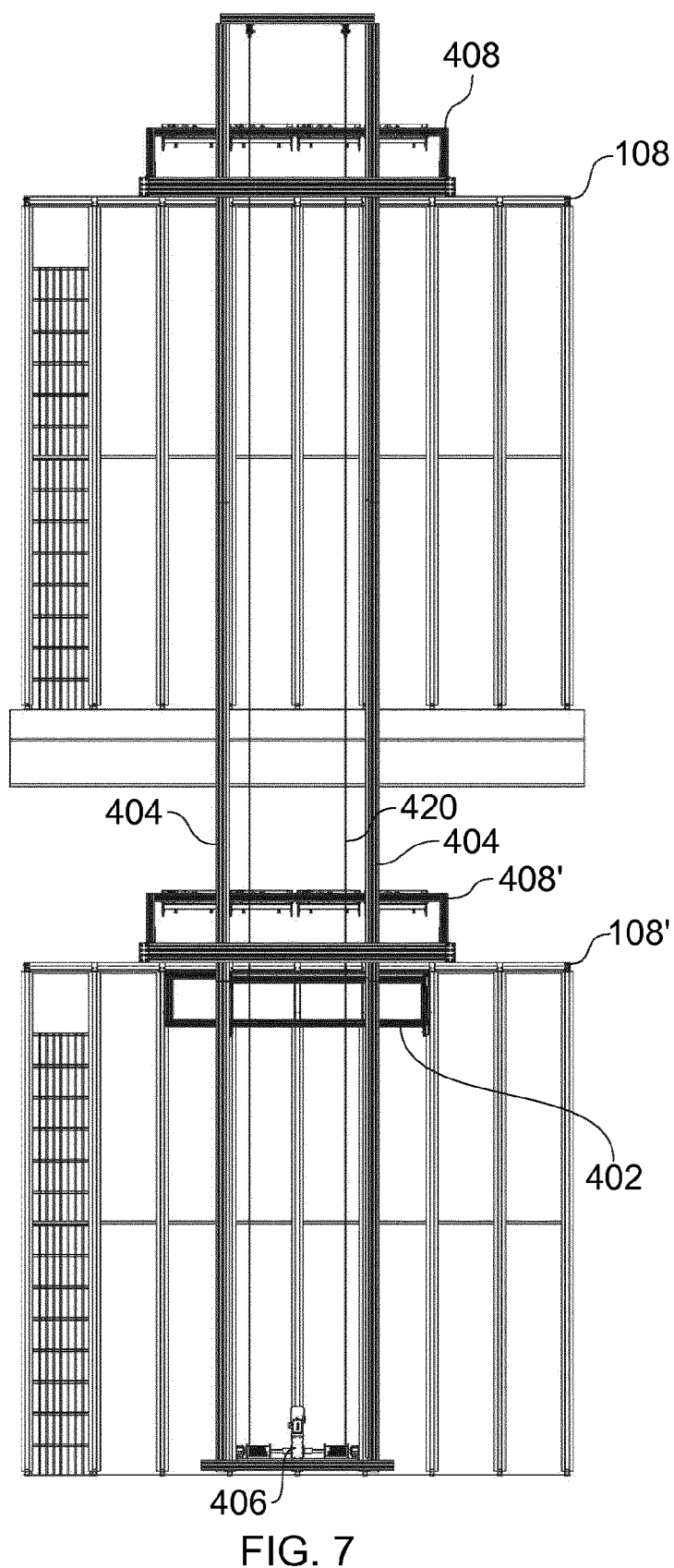
FIG. 7 is a side elevational view of a multi-level automated storage and retrieval system

According to one aspect, automated storage and retrieval system 1 may comprise multiple levels, as shown in FIGS. 4 and 5 which depict two levels of storage grids 104 and 104'. There, first storage grid 104 is arranged vertically above a corresponding second storage grid 104', for example on an upper floor of a building directly above second storage grid 104'. FIG. 4 depicts first storage grid 104 and second storage grid 104' as having the same number columns in the X and Y directions. It should be understood that this is not necessarily the case, as the grids on different levels may have different configurations. As can be seen in FIG. 5, grid columns 112 of first storage grid 104 are essentially in alignment with corresponding grid columns 112' of second storage grid 104 along a front face 400 and 400' respectively. FIG. 6 shows container handling vehicles 201 and 201' (alternatively 301/301') traveling on rail system 108 and 108' respectively.

According to one aspect, the present invention provides a bin lift arrangement for transporting storage bins between levels in a multi-level automated storage and retrieval system, and for transporting storage bins between the top of a storage grid 104/104' to the bottom of the storage grid, where the storage bins can for example be further transported to an access station.

The bin lift arrangement comprises a vertically movable platform 402 that is vertically movable, adjacent to a face of the grid, along one or more, preferably two, vertical lift rails 404. As can be seen in FIG. 5, platform 402 has a depth essentially corresponding to the width of a storage container 106, and lift rails 404 are arranged outside a face, for example a front face 400/400' of storage grid 104/104' in this embodiment at a distance such that a front edge of platform 402 is functionally adjacent to front face 400/400'.

Figure 8:
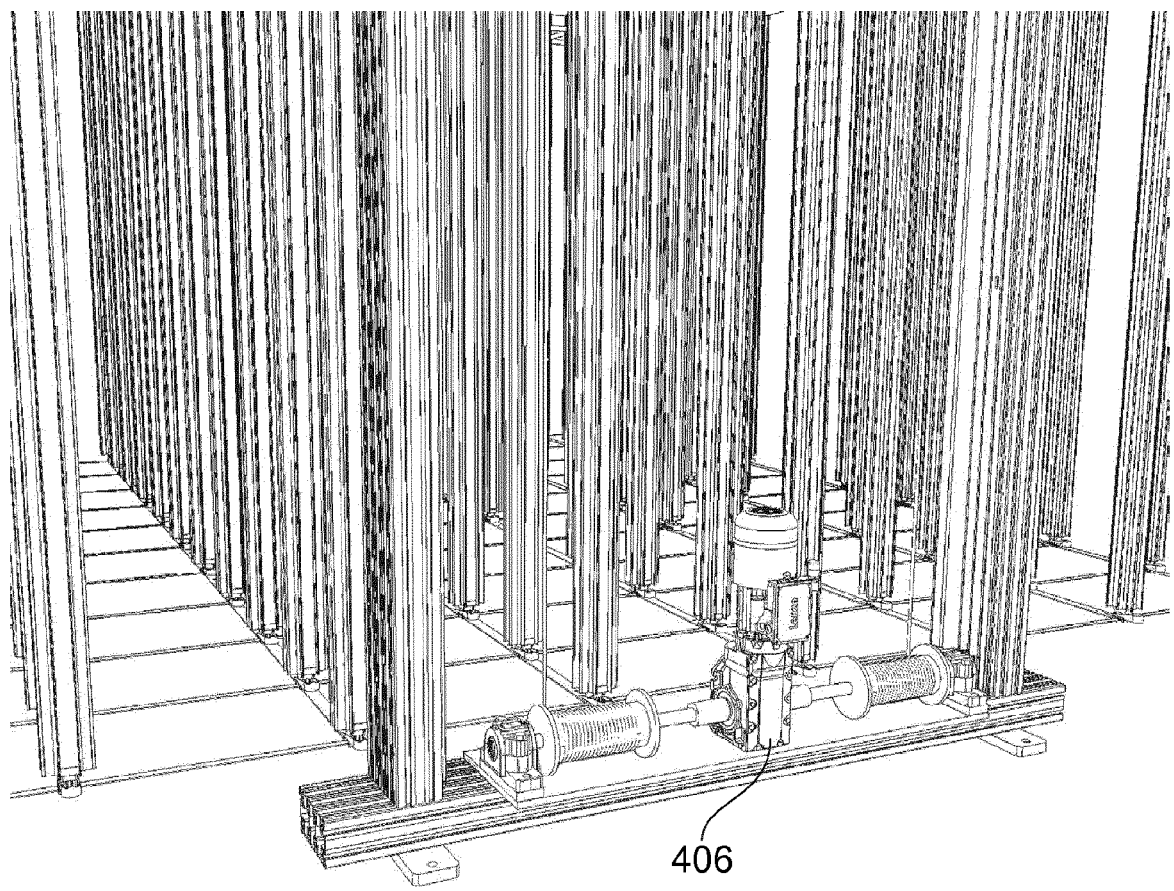
FIG. 8 is a close up view of a motor and pulley arrangement.

The term "functionally adjacent" as used herein means that the platform can move up and down in the vicinity of grids 104/104' without interference. Platform 402 is arranged to receive and transport one or more storage bins 106 in a vertical direction. Platform 402 may be movable by a motor and pulley arrangement 406, e.g., as shown in FIG. 8 or by other lifting means known in the art.

Figure 9:
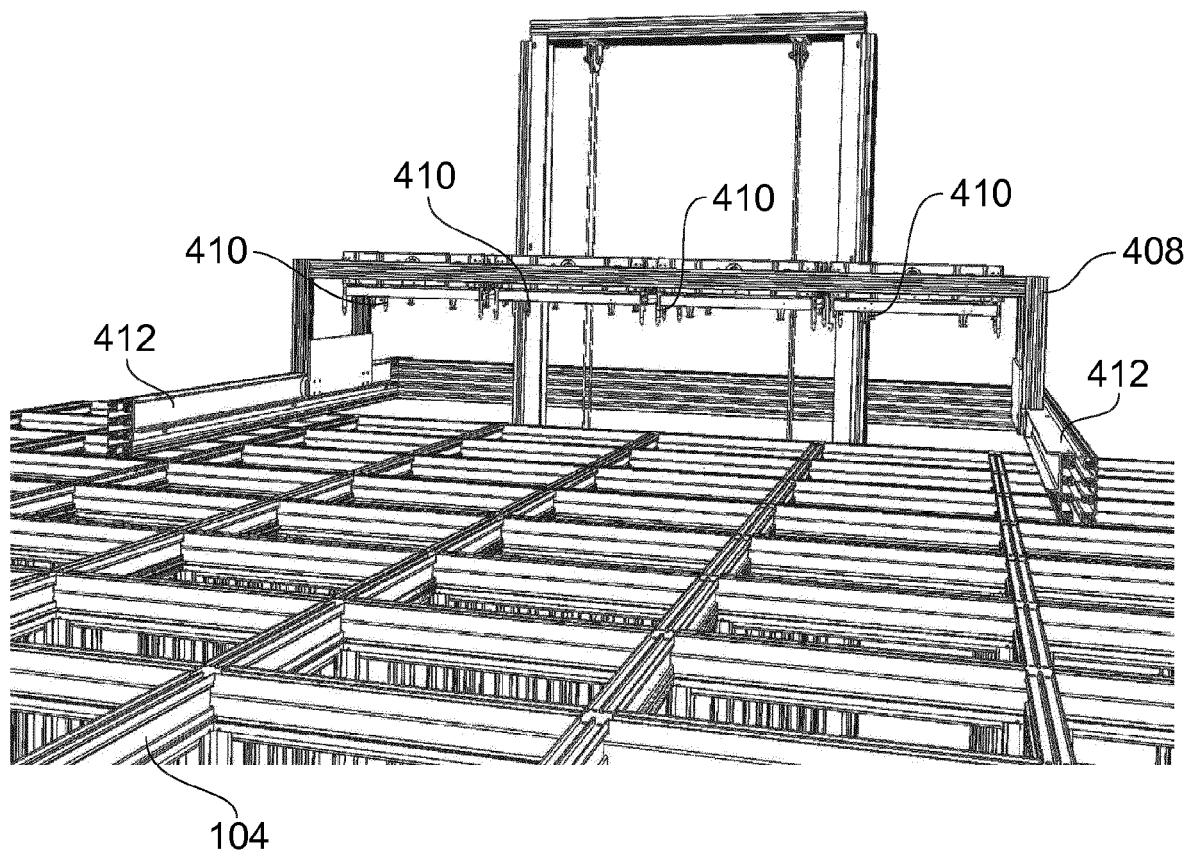
FIG. 9 shows an embodiment of a manipulator trolley for movement of storage containers from a top level grid to a lift platform of the invention.
Figure 10:
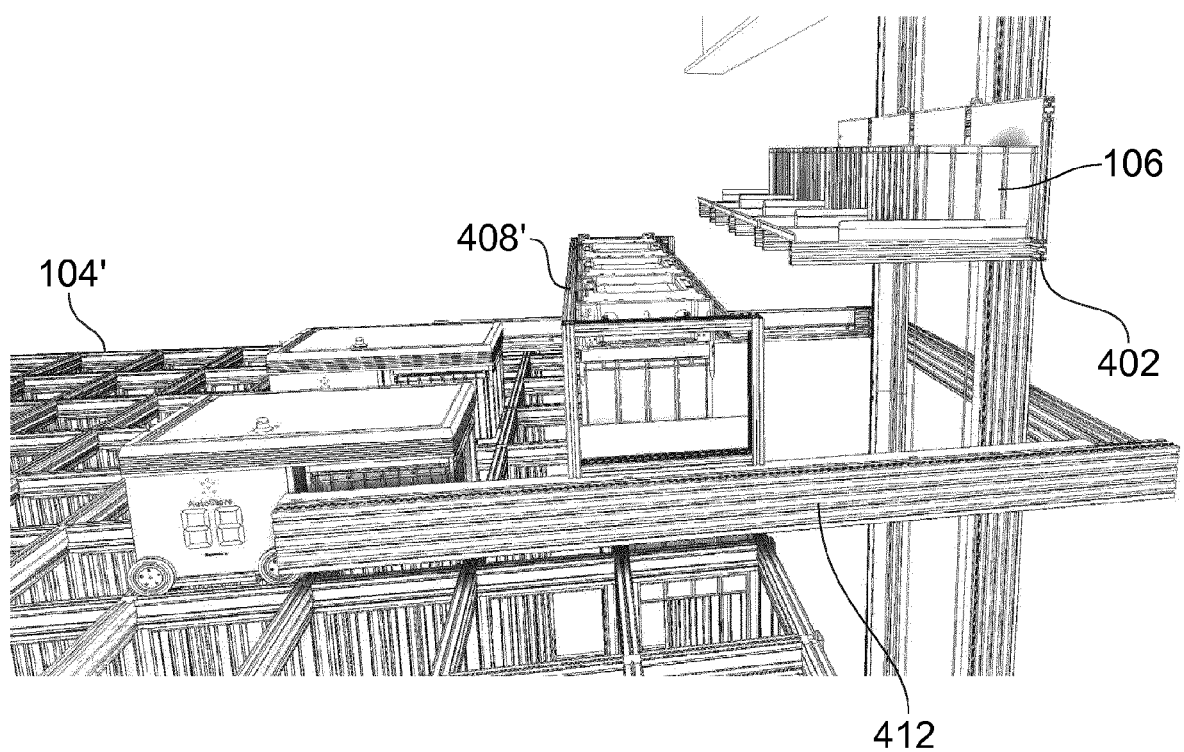
FIG. 10 shows an embodiment of a manipulator trolley for movement of storage containers from a lower level grid to an exemplary lift platform of the invention.

Storage containers 106 are movable from storage grid 104/104' to and from platform 402 by a dedicated mechanical device for grabbing, lifting and moving the storage containers. The term "dedicated mechanical device" as used herein refers to a device separate from the container handling vehicles 201/20G/01/30G, the function of which is primarily reserved for the movement of containers between the grid and the platform and vice versa. In one embodiment such a device is in the form of a manipulator trolley 408/408' as shown in FIGS. 9 and 10. FIG. 9 shows a manipulator trolley 408 arranged in connection with a top level grid 104, while FIG. 10 shows a manipulator trolley 408 arranged in connection with lower level grid 104'. Manipulator trolleys 408/408' have one or more grabbing/lifting mechanisms 410 arranged to grab a storage container 106 from a position at the top of the storage grid and lift the container upward, whereupon the manipulator trolley 408/408' transports the storage container to a position above platform 402, whereupon the grabbing/lifting mechanism 410 lowers the storage container onto the platform. When platform 402 returns with storage containers 106, the manipulator trolleys 408/408' perform this sequence in reverse to remove a container from the platform 402 and place it on the top of the storage grid 104/104'.

Manipulator trolleys 408/408' are movable from the position over the storage grid 104/104' to the position over platform 402 by travelling by a motorized mechanism along horizontal trolley rails 412. In one embodiment, shown in FIG. 5, trolley rails 412 are arranged immediately above rail system 108/108' on which the container handling vehicles 201,301 travel. In another embodiment, shown in FIG. 6, trolley rails 412 may be suspended above rail system 108/108' at distance greater than the height of the vehicles such that the vehicles can travel underneath the trolley rails 412.

Figure 11:
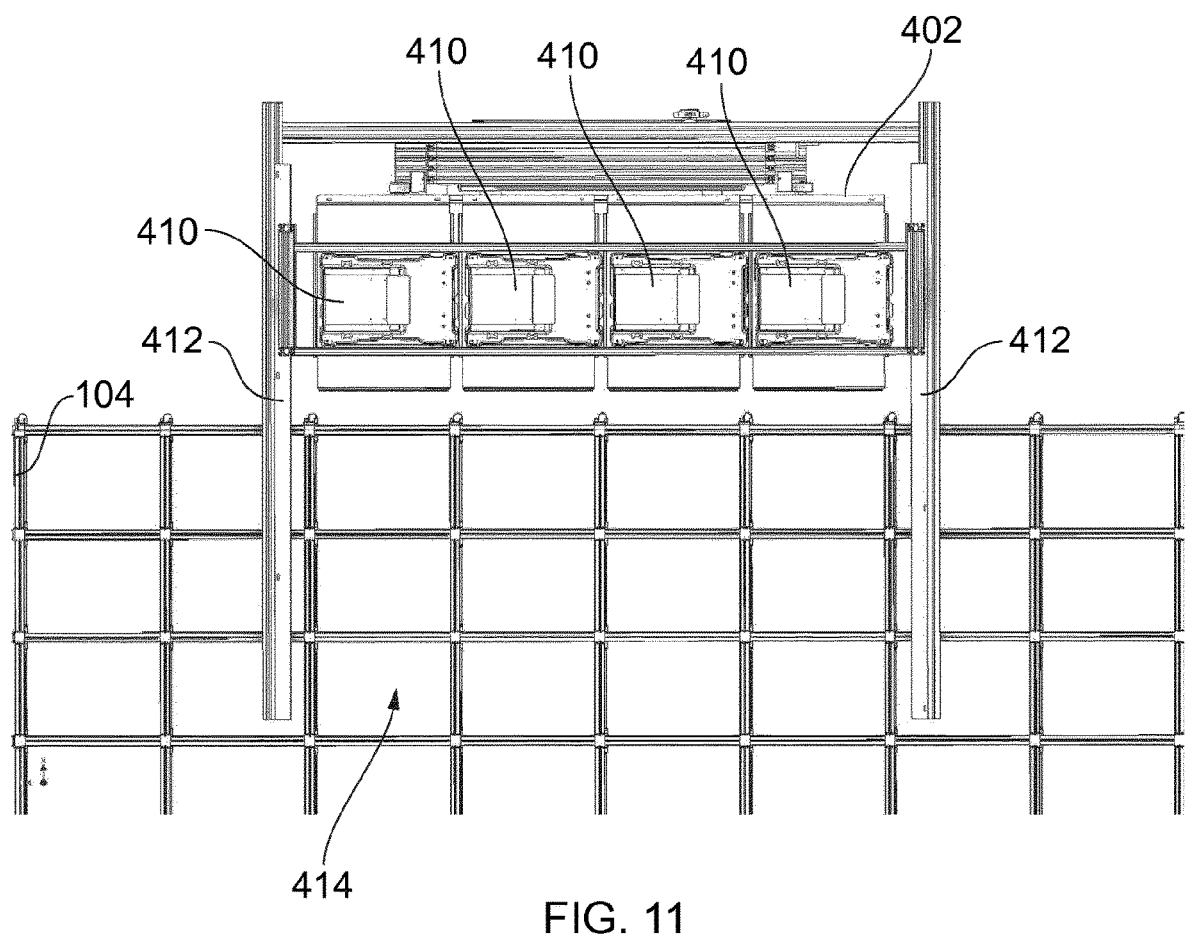
FIG. 11 is a top view of a staging area showing "put" cells and "get" cells.

According to one aspect of the invention, as shown in FIG. 11, the area of the grid arranged between trolley rails 412 denotes a staging area 414. Staging area 414 comprises cells at the top level of the grid where containers 106 may be placed by vehicles 201/301 where they wait to be retrieved and moved by manipulator trolley 408, as well as cells where manipulator trolley may place cells where they wait to be retrieved by vehicles. These cells may be referred to as "put" cells and "get" cells respectively, represented by the letters P and G in FIG. 11. Here there is shown four put cells along the far edge of the grid surface, and four get cells arranged along the next inner most row, corresponding to a platform 402 with a capacity of four containers 106. It should be understood that platform 402 may have a different capacity, and that staging area 414 and the put cells P and get cells G may be arranged in any manner and may be dynamically redesignated as necessary, for example according to routing considerations determined by the automated storage system.

Figure 12:
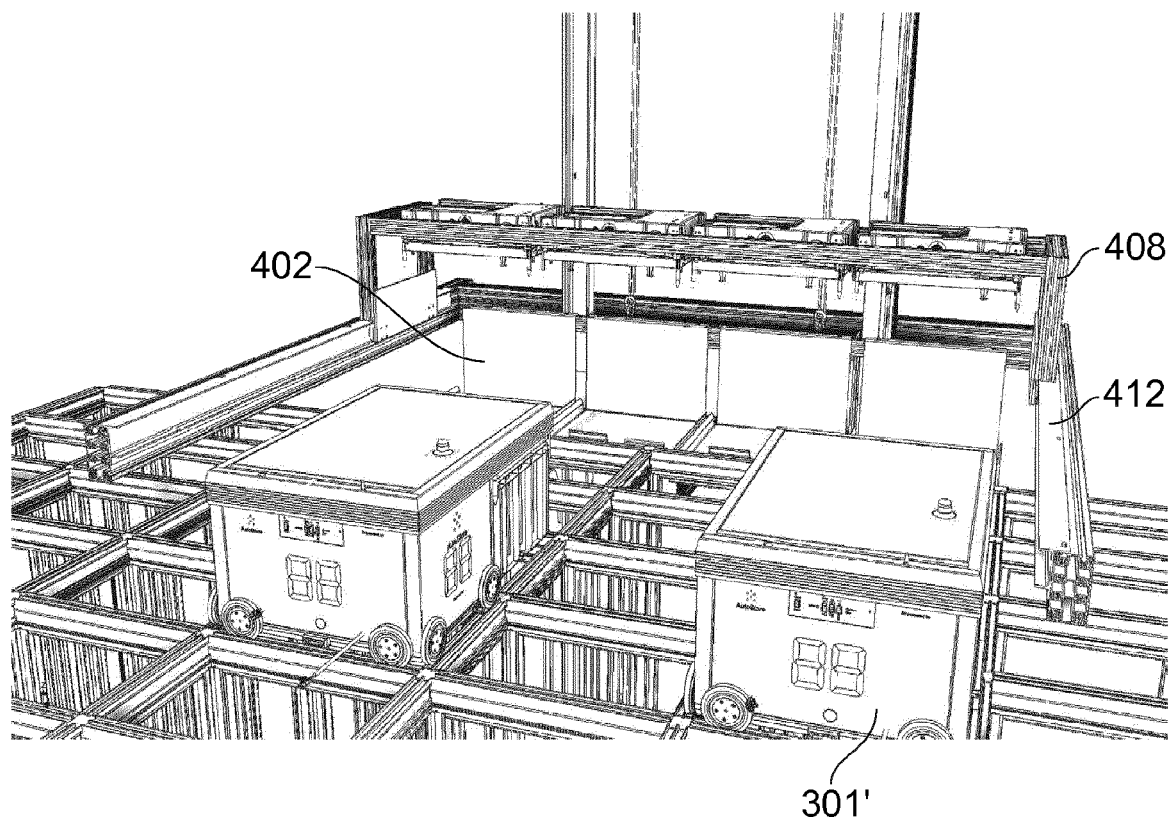
FIG. 12 is a close up perspective view showing container handling vehicles placing containers in the staging area.

In operation, as illustrated in FIG. 12, container handling vehicles 201,301 place containers 106 in the put cells P, thus freeing the vehicles to attend to other tasks. Manipulator trolley 408/408' will then grab the containers 106 in the put cells P, preferably grabbing and lifting the containers 106 in unison, and place the containers 106 on platform 402. In the event that the platform 402 is transporting containers 106 for replacement in the storage columns 112,112', the manipulator trolley 408 will first place the returning containers in the get cells G, move over to the put cells and lift the containers 106 arranged there, and thereafter place those containers on platform 402. Vehicles may then arrive to retrieve the containers 106 from the get cells G, and replace them in the storage columns 112,112'.

Figure 13:
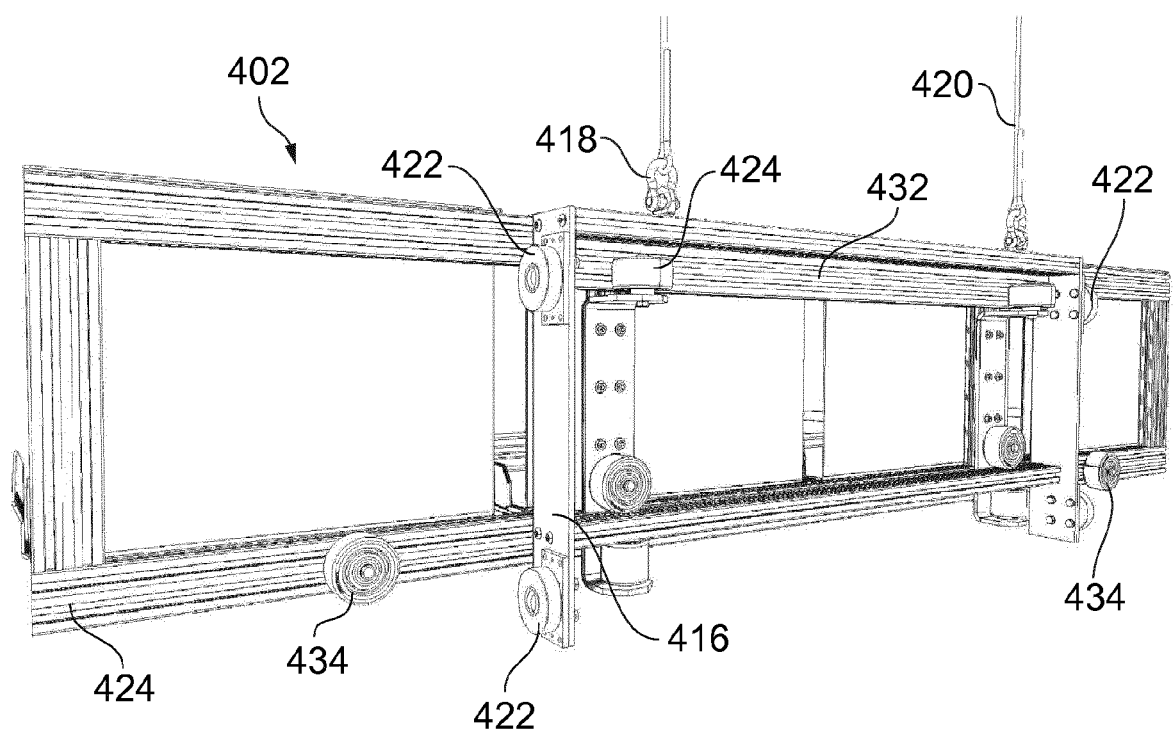
FIG. 13 is a perspective view of an embodiment of the lift platform.
Figure 14:
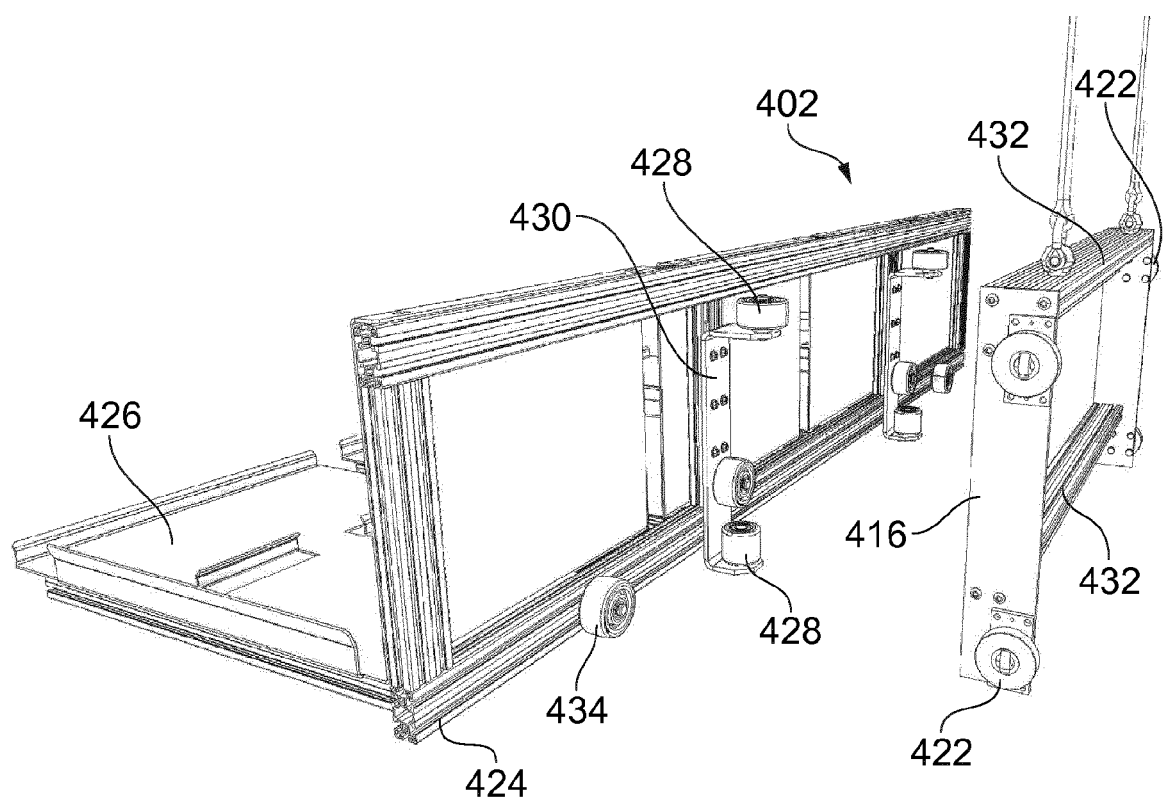
FIG. 14 is an exploded view of the lift platform of FIG. 13.
Figure 15:
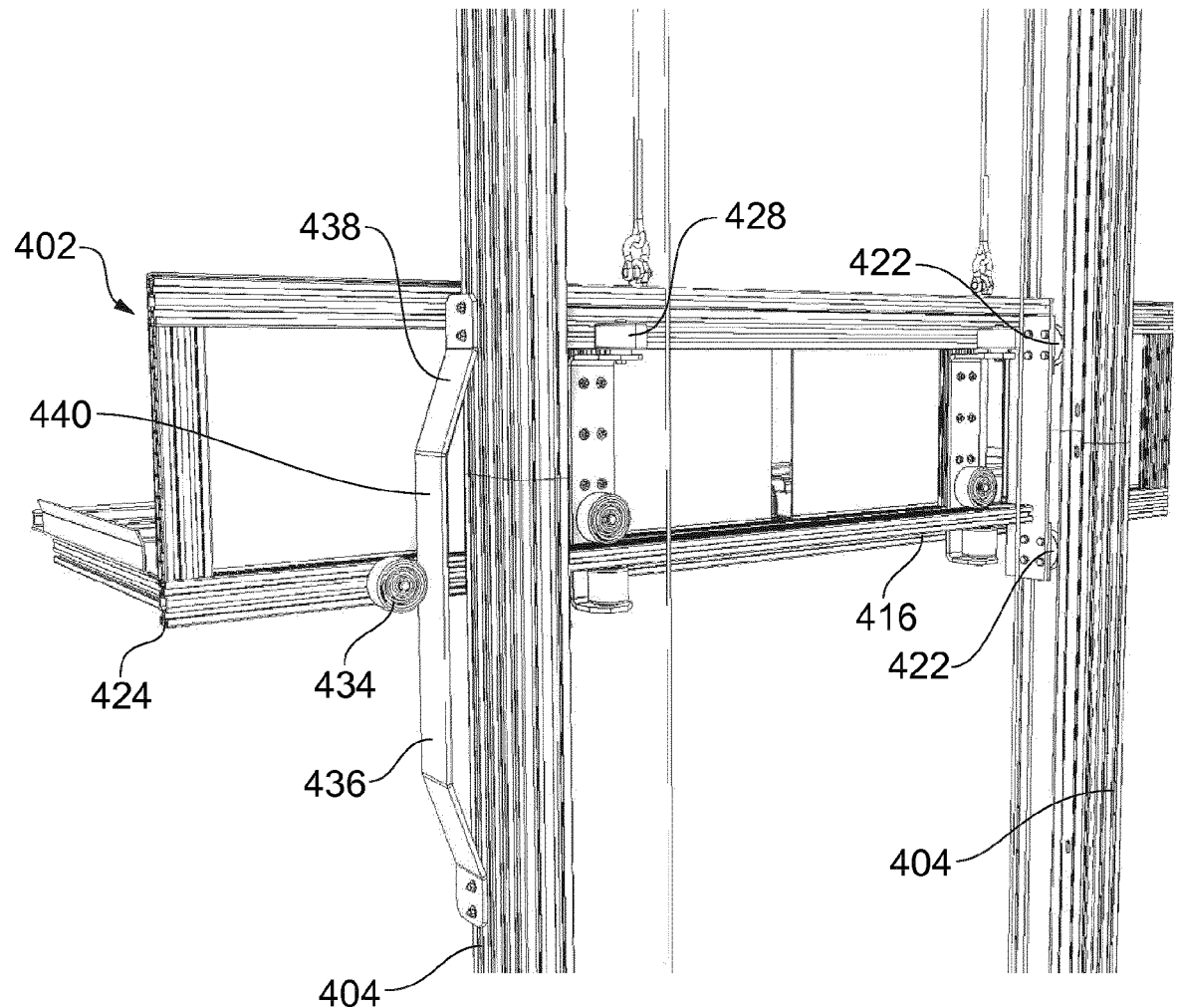
FIG. 15 is a perspective view of the lift platform of FIG. 13 and means for adjusting the horizontal position of the platform.

According to one embodiment of the invention, platform 402 is movable in a horizontal direction, transverse to its vertical direction of travel. This horizontal movement is provided to account for any potential horizontal misalignment between columns 112 of different grid levels. FIGS. 13-15 illustrate one embodiment of platform 402 that provides for such horizontal displacement. It should be understood that other arrangements for horizontal adjustment of platform 402 are possible within the scope of the invention.

FIG. 13 shows an assembled platform 402, while FIG. 14 shows an exploded view of platform 402. Platform 402 comprises a rectangular lifting frame 416. Lifting frame 416 has connection points 418 along a top edge, for example a shackle, for attachment to one or more pulley lines 420 operated by motor/pulley arrangement 406. Lifting frame 416 further comprises a plurality of rail wheels 422 arranged to engage and travel along lift rails 404.

Platform 402 further comprises a horizontally movable carriage member 424 with a receiving surface 426 on which storage bins 106 may be placed. Carriage member 424 has rearward extending guide wheels 428 mounted on a bracket 430. As seen in FIG. 13, guide wheels 428 engage an inner surface of horizontal guide rails 432 of lifting frame 416. Guide wheels 428 thus allow carriage member 424 to move horizontally in relation to lifting frame 416.

As shown in FIG. 15, lifting frame 416 has essentially the same width as the space between lift rails 404, with carriage member 424 being wider than and extending beyond lift rails 404 to both sides. Carriage member 424 is equipped with one or more alignment wheels 434. Alignment wheels 434 are mounted in a position on the back portion of carriage member 424 such that alignment wheels 434 are arranged to the outsides of lift rails 404.

In the event the columns of a second grid level are out of alignment in the horizontal direction with a first level by a known distance, an alignment bracket 436 may attached to lift rail 404 at the vertical position where platform 402 will stop to retrieve or unload containers. Alignment bracket 436 has sloped portions 438 and an intermediate straight portion 440. Sloped portions 438 are arranged to extend the straight portion 440 a distance from the lift rails 402 a distance corresponding to the degree of misalignment between columns of the two levels. As be appreciated from FIG. 15, as platform 402 is lowered along lift rails 404, alignment wheels 434 will ride up along sloped portion 438, thereby causing carriage member 424 to move horizontally, via guide wheels 428 in relation to lifting frame 416. According to one embodiment, the storage and retrieval system may comprise an inventory of alignment brackets 436 with various offset distances. In the event that grid levels become out of alignment, the operator of the system can simply select the bracket with appropriate offset.

Figure 16:
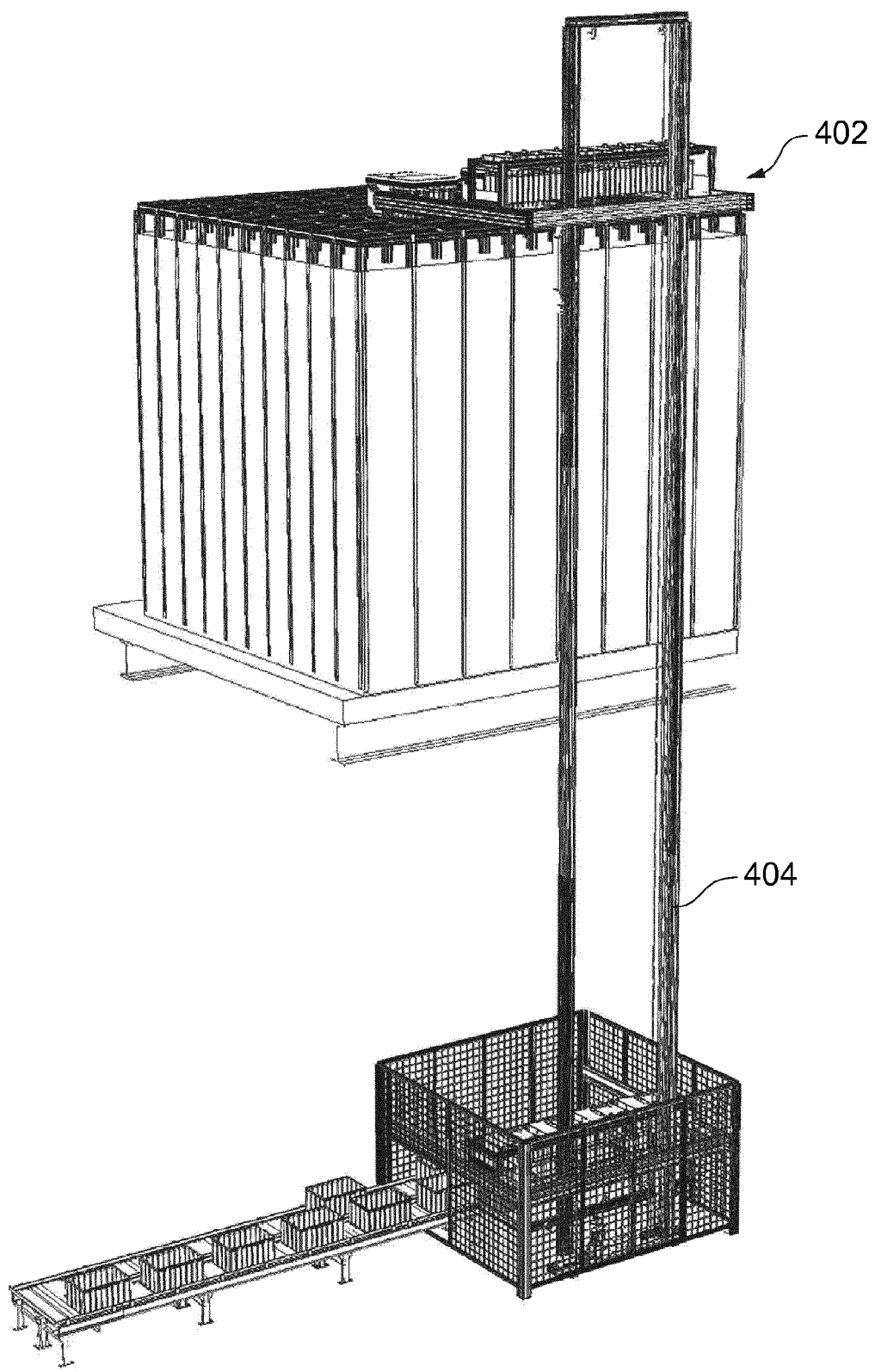
FIG. 16 is a perspective view of an automated storage and retrieval system with an offloading/offloading station at a lower level.
Figure 17:
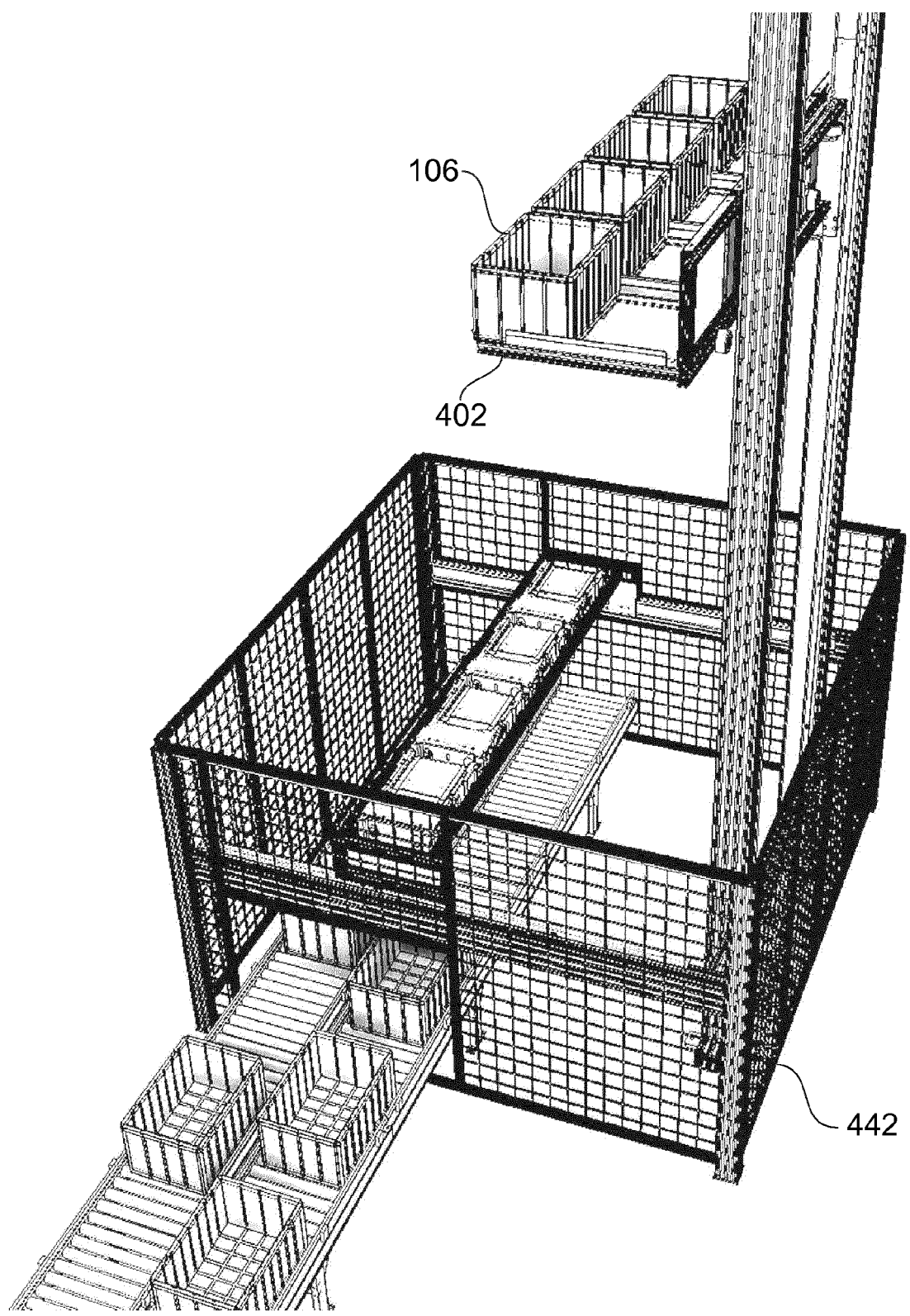
FIG. 17 is a close up view of the offloading/onloading station with a conveyor arrangement.
Figure 18:
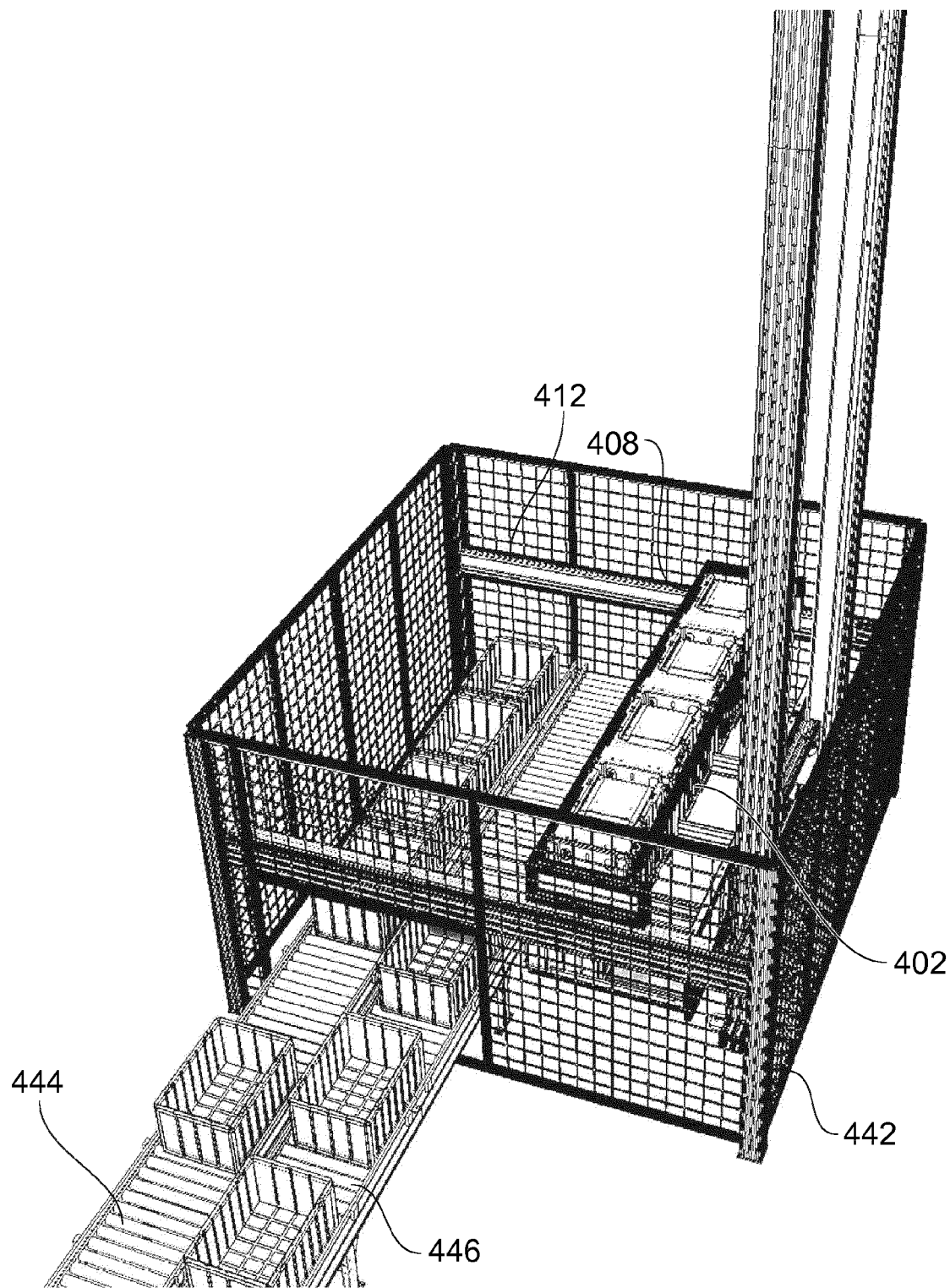
FIG. 18 is a close up view of the offloading/onloading station of FIG. 17 with the conveyor arrangement.
Figure 19:
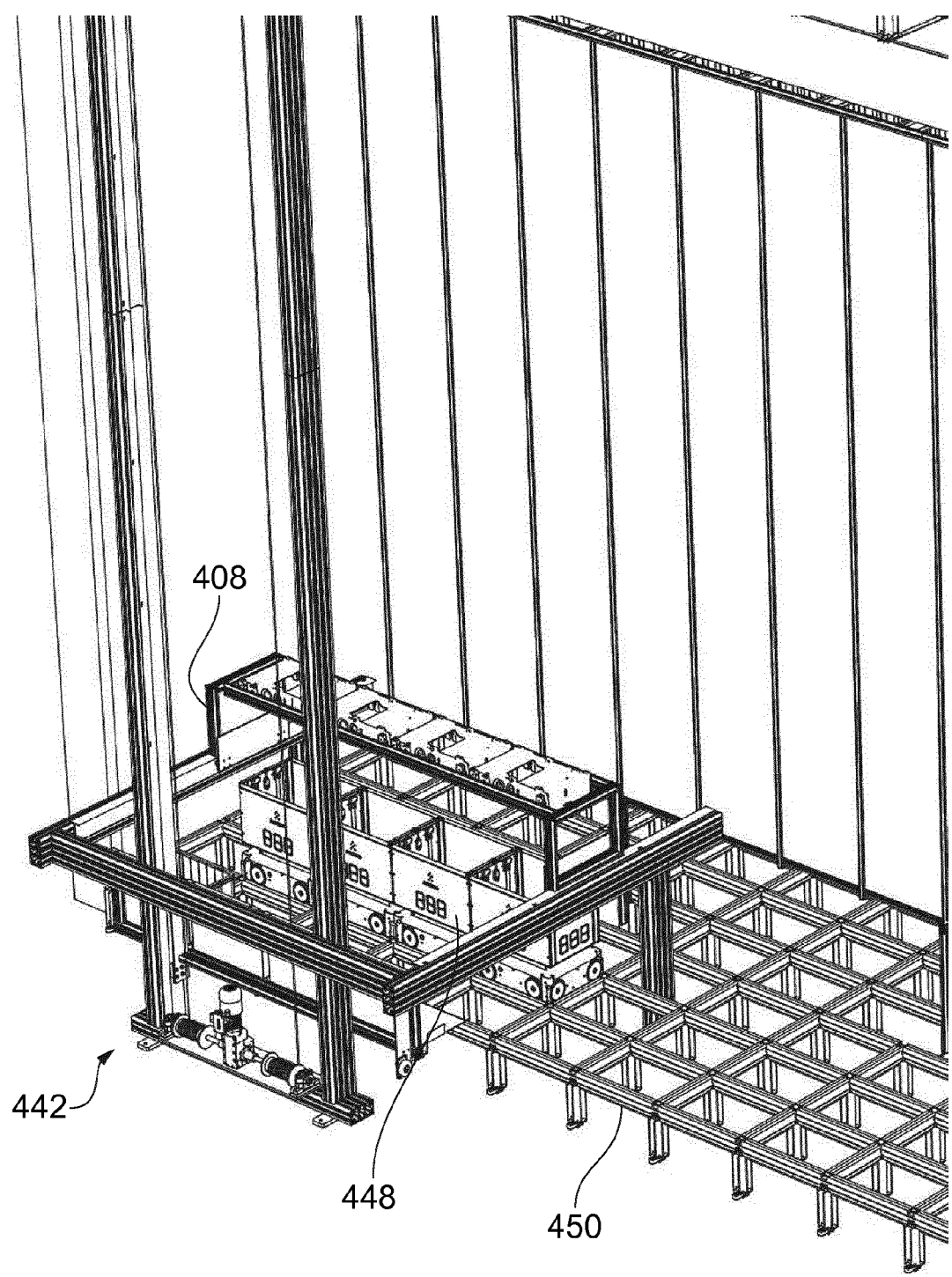
FIG. 19 is a close up view of the offloading/onloading station in operation with autonomous delivery vehicles.

According to yet another embodiment of the invention, an offloading/offloading station 442 may be arranged at a lower level of the automated storage system, at the bottom of lift rails 404. At offloading/offloading station 442, storage bins are moved by a manipulator trolley 408 arranged in connection with station 442 for offloading storage bins from the lifting arrangement for transport to a different location, for example to an access station (not shown) where the bins can be accessed by an operator. Conversely, bins may be loaded onto the lift arrangement at station 442 for transporting to an upper level of the grid. FIG. 16 shows station 442, with platform 402 at an upper level of the grid for retrieving bins 106, FIG. 17 shows platform 402 in transit to station 442, while FIG. 18 shows platform 402 arrived at station 442. In FIG. 18, it can be seen that manipulator trolley 408 travels along trolley rails 412 to offload/offload bins 106 from platform 402.

FIGS. 16-18 show a first embodiment where manipulator trolley 408 moves bins 106 onto, and retrieves bins 106 from a convey system comprising a delivery line 444 and a return line 446. Lines 444 and 446 transport bins 106 to a different location, for example an access station (not shown). In an alternative embodiment, manipulator trolley 408 at offloading/offloading station 442 may place bins 106 directly into, or retrieve bins 106 directly from, one or more autonomous delivery vehicles. Delivery vehicles 408 are more fully described in applications N020180813 filed Jun. 12, 2018 and N020181005 filed Jul. 19, 2018, the entire contents of which are hereby incorporated by reference as if fully reproduced herein. Delivery vehicles 448 have a bin receiving portion where bins 106 may be placed by manipulator trolley 408. Delivery vehicles 448 are then free to travel along their own dedicated rail system 450 to a different location, such as the access station. The combination of the lifting arrangement of the present invention with the autonomous delivery vehicles may dramatically increase the flexibility and throughput of the automated storage system. The dedicated rail system may comprise a first rail system located within the framework structure of the storage grid, and a second rail system located outside the framework structure of the storage grid, and wherein the first and second rail system are connected such that the delivery vehicle may operate between said rail systems.

The second location may be connected to the second rail system.

What is claimed is:

1. A method for transporting storage containers in an automated storage system comprising a platform comprising a plurality of upright members and horizontal members defining a framework structure in a form of a grid of storage columns containing storage containers arranged in stacks, and having automated container handling vehicles operating on a rail system on a top level of the grid, the rail system comprising perpendicular horizontal tracks upon which the vehicles can travel in a first direction and a second direction perpendicular to the first direction, an intersection of the perpendicular tracks further defining cells above grid columns, the method comprises:
- arranging the platform adjacent to a face of the grid;
- arranging a dedicated mechanical device for grabbing, lifting, and moving the storage containers from a top of the grid and placing containers on the platform and vice versa;
- designating a first number of cells for a placement of storage containers awaiting movement from the grid to the platform;
- designating a second number of the cells for the placement of storage containers awaiting retrieval by container handling vehicles;
- causing the container handling vehicles to place storage containers on cells;
- causing the dedicated mechanical device to remove any containers from the platform and place said containers on cells;
- causing the dedicated mechanical device to lift the storage containers from cells and place the containers on the platform;
- causing the platform to lower the containers to a lower level in the grid system; and
- adjusting a horizontal position of a transportation platform of a type where the platform travels vertically along one or more vertical rails, wherein the steps comprises:
  - arranging the platform to be vertically movable along the vertical rails, wherein the platform comprises a vertically movable frame member to which is connected to a horizontally movable carriage member, wherein the carriage member further comprises one or more alignment, guides in a form of wheels connected to the carriage member at a position whereby the alignment wheels travel along a surface of the vertical rails during vertical movement of the platform,
  - arranging, on the vertical rails, one or more alignment brackets, the alignment brackets, which comprise an upper and lower sloped surface, and an intermediate straight surface, protruding from a side of the vertical rails a distance corresponding to an intended horizontal adjustment distance for the platform, and
  - causing the alignment wheel or wheels to, during vertical movement of the frame member, contact and roll up the upper and lower sloped surface of the protruding alignment bracket mounted on the vertical rail, thereby causing the carriage member to move in a horizontal direction in relation to the frame member,
  - wherein the upper and lower sloped surface are arranged to extend the intermediate straight surface a distance from the vertical rails, which corresponds to a degree of misalignment between the storage columns of the top level and the lower level.

2. The method according to claim 1, wherein lower level is a vertically arranged lower grid section, and wherein the platform is horizontally adjustable to accommodate any horizontal misalignment between the grid section and the lower grid section.

3. The method according to claim 1, wherein the first number of the cells and the second number of the cells are arranged in respectively rows.

\* \* \* \* \*